(12) United States Patent
Shirvani et al.

(10) Patent No.: US 10,852,135 B2
(45) Date of Patent: Dec. 1, 2020

(54) SENSOR WITH LOW POWER WITH CLOSED-LOOP-FORCE-FEEDBACK LOOP

(71) Applicant: InvenSense, Inc., San Jose, CA (US)

(72) Inventors: Alireza Shirvani, Menlo Park, CA (US); Michael Perrott, Nashua, NH (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/514,368

(22) Filed: Jul. 17, 2019

(65) Prior Publication Data

US 2019/0339077 A1  Nov. 7, 2019

Related U.S. Application Data

(62) Division of application No. 15/265,740, filed on Sep. 14, 2016, now Pat. No. 10,393,522.

(60) Provisional application No. 62/361,428, filed on Jul. 12, 2016.

(51) Int. Cl.
*G01C 19/56* (2012.01)
(52) U.S. Cl.
CPC .................................. *G01C 19/56* (2013.01)
(58) Field of Classification Search
None
See application file for complete search history.

(56) References Cited

U.S. PATENT DOCUMENTS

| | | | |
|---|---|---|---|
| 6,276,204 B1* | 8/2001 | Townsend | G01C 19/56 73/504.12 |
| 7,950,281 B2* | 5/2011 | Hammerschmidt | G01C 19/5719 73/504.04 |
| 2008/0202237 A1* | 8/2008 | Hammerschmidt | G01C 19/5719 73/504.04 |
| 2009/0066550 A1* | 3/2009 | Hammerschmidt ... | G01C 19/56 341/143 |
| 2010/0307241 A1* | 12/2010 | Raman | G01C 19/56 73/504.12 |

* cited by examiner

*Primary Examiner* — Paul M. West
*Assistant Examiner* — Mark A Shabman

(57) ABSTRACT

A device includes a proof mass of a sensor, capacitive elements, an electrode circuitry, a time multiplexing circuitry, a sense circuitry, and a force feedback circuitry. The proof mass moves from a first position to a second position responsive to an external actuation. The capacitive elements change capacitive charge in response thereto. The electrode circuitry coupled to the capacitive elements generates a charge signal. The time multiplexing circuitry pass the charge signal during a sensing time period and prevents the charge signal from passing through during a forcing time period. The sense circuitry generates a sensed signal from the charge signal. The force feedback circuitry applies a charge associated with the sensed signal to the electrode circuitry during the forcing time period. The electrode circuitry applies the charge received from the force feedback circuitry to the capacitive elements, moving the proof mass from the second position to another position.

17 Claims, 10 Drawing Sheets

SENSOR WITH LOW POWER WITH CLOSED-LOOP-FORCE-FEEDBACK LOOP

RELATED APPLICATIONS

This application is a divisional application and claims the benefit and priority to the nonprovisional patent application Ser. No. 15/265,740, filed on Sep. 14, 2016, which claims the benefit and priority to the provisional patent application No. 62/361,428, filed on Jul. 12, 2016, entitled "System and method for MEMS gyroscope force-feedback using low power time-interleaving techniques," which are incorporated herein by reference in their entirety.

BACKGROUND

Many gyroscopes use open loop architecture to directly measure output of a micro-electro-mechanical systems (MEMS). Unfortunately, open loop architecture suffers from stability due to environmental factors such as temperature and strain as well as aging. In contrast, closed loop architecture such as closed-loop-force-feedback architecture can be used to actuate the sense resonator to cancel out the movement induced by the rate of rotation and to use the feedback signal as a measure of the gyroscope's input. While the closed-loop-force-feedback architecture is more stable it traditionally requires high voltage drivers and results in an increased system power consumption which is undesirable.

SUMMARY

Accordingly, a need has arisen to develop a stable closed-loop-force-feedback architecture with minimal impact on system power consumption. Moreover, a need has arisen to develop a stable closed-loop-force-feedback architecture that enables mode matching design where the drive and sense resonators have the same resonance frequency. It is further desirable to develop a stable closed-loop-force-feedback architecture with flexibility of calibrating the gyroscope's bias, e.g., offset, and its sensitivity, e.g., gain, over time and temperature or other ambient variability.

In some embodiments, the sense electrodes of the gyroscope may be used for both actuation and sensing. According to some embodiments, the sensed signal is time multiplexed and charges associated with the time multiplexed signal is determined. During a forcing time period the determined charges are applied to the sense electrodes which apply the charges to the capacitive elements that force the proof mass back to its initial position.

According to some embodiments, a device includes a proof mass associated with a sensor, capacitive elements, an electrode circuitry, a time multiplexing circuitry, a sense circuitry, and a force feedback circuitry. The proof mass is configured to move from a first position to a second position in response to application of an external actuation, e.g., force, rotation, etc. The capacitive elements are configured to change capacitive charge stored thereon in response to the proof mass moving from the first position to the second position. The electrode circuitry is coupled to the capacitive elements and is configured to generate a charge signal thereof. The time multiplexing circuitry is coupled to the electrode circuitry and is configured to pass the charge signal during a sensing time period, in response to a control signal. The time multiplexing circuitry is further configured to prevent the passing of the charge signal during a forcing time period, responsive to the control signal. The sense circuitry is configured to receive the charge signal from the time multiplexing circuitry during the sensing time period and to generate a sensed signal. The force feedback circuitry is configured to apply a charge associated with the sensed signal to the electrode circuitry during the forcing time period. The application of the charge to the electrode circuitry is responsive to the control signal. The electrode circuitry applies the charge received from the force feedback circuitry to the capacitive elements to move the proof mass from the second position to another position.

In some embodiments, the another position is a position between the first position and the second position. It is appreciated that the application of the charge received from the force feedback circuitry to the capacitive elements moves the proof mass to the another position and reduce movement of the proof mass. In some embodiments, a velocity associated with movement of the proof mass approaches zero over time in response to application of the charge by the electrode circuitry to the capacitive elements. The sensor may be a gyroscope.

The capacitive elements may include a first and a second capacitor. The charges stored on the first capacitor changes in one polarity direction in response to the proof mass moving from the first position to the second position. The charges stored on the second capacitor changes in another polarity direction in response to the proof mass moving from the first position to the second position. The change in polarity directions of the first and the second capacitor are in opposite direction of one another.

The electrode circuitry may include a first and a second electrodes with opposite polarities. The time multiplexing circuitry may include a plurality of switches that open and close in response to the control signal. The force feedback circuitry may include a plurality of switches that open during the sensing time period and close during the forcing time period.

The device may further include an amplifier coupled to the time multiplexing circuitry that is configured to amplify the sensed signal. The device may also include an analog to digital convertor configured to convert the amplified sensed signal to a digital signal. The device may further include a digital signal processor (DSP) coupled to the analog to digital convertor configured to process the sensed signal and to determine the charge associated with the sensed signal to be applied to the electrode circuitry during the forcing time period. In some embodiments, the device includes a digital to analog convertor (DAC) coupled to the DSP. The DAC is configured to convert digital signal to analog signal and to generate a force signal based on the determined charge associated with the sensed signal.

In some embodiments, the sensor may include a drive circuitry. The drive circuitry may include an amplifier, an analog to digital convertor, a digital resonator, and a feedback loop. The amplifier is configured to amplify a drive signal. The analog to digital convertor is configured to convert the amplified drive signal from analog signal to digital signal. The digital resonator is configured to resonate at a resonance frequency to reduce error, e.g., phase error. The feedback loop is configured to receive signal from the digital resonator and apply a feedback signal to an input of the amplifier. The feedback loop includes a digital to analog convertor coupled in series with an optional capacitor.

These and other features and aspects of the concepts described herein may be better understood with reference to the following drawings, description, and appended claims.

DETAILED DESCRIPTION

Figure 1:
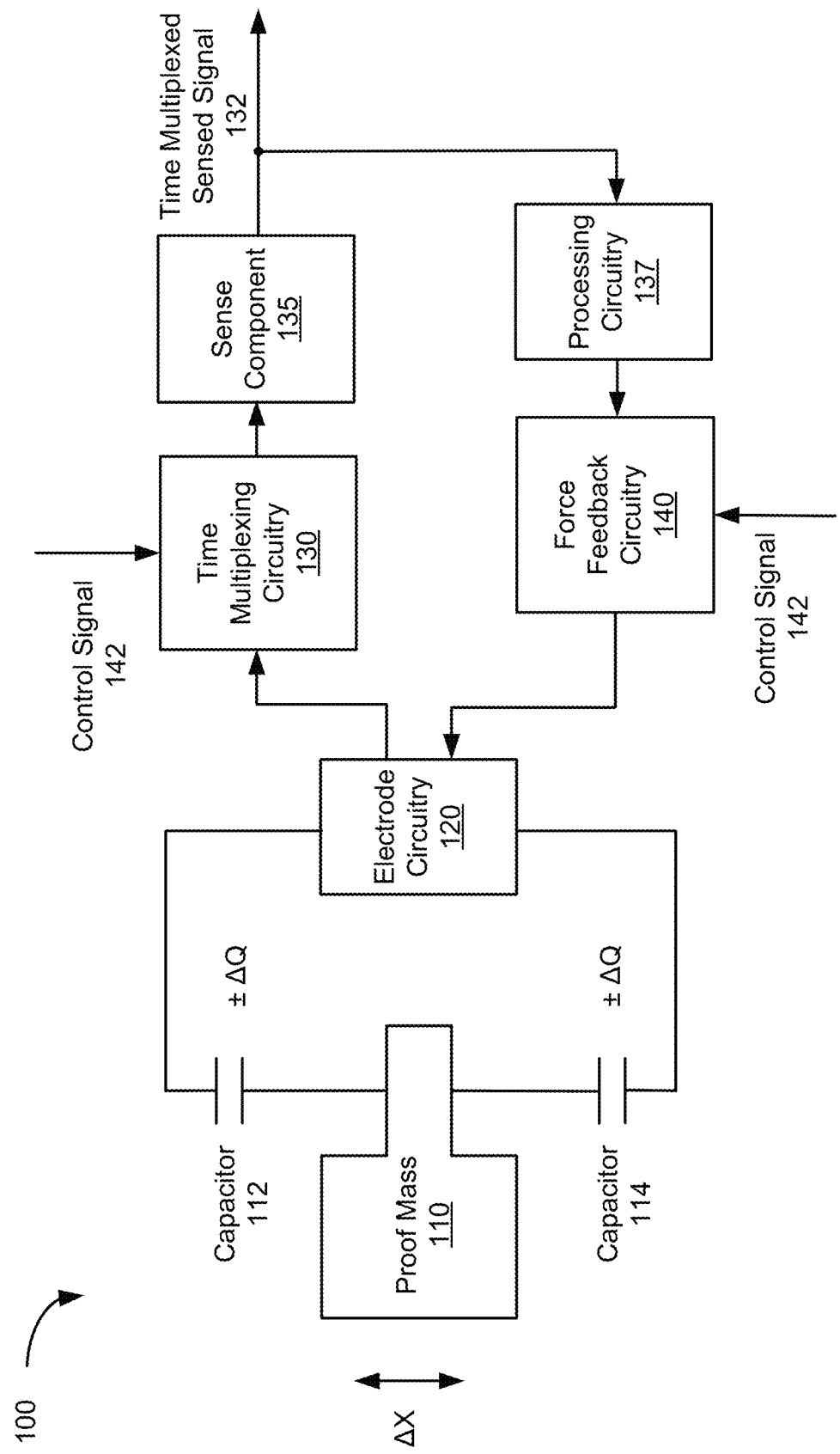
FIG. 1 shows a sense circuitry of a sensor in accordance with some embodiments.

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "forward," "reverse," "clockwise," "counter clockwise," "up," "down," or other similar terms such as "upper," "lower," "above," "below," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

A need has arisen to develop a stable closed-loop-force-feedback architecture with minimal impact on system power consumption. Moreover, a need has arisen to develop a stable closed-loop-force-feedback architecture that enables mode matching design where the drive and sense resonators have the same resonance frequency. It is further desirable to develop a stable closed-loop-force-feedback architecture with the flexibility of calibrating the gyroscope's bias, e.g., offset, and its sensitivity, e.g., gain, over time and temperature or other ambient variability.

In some embodiments, the sense electrodes of the gyroscope may be used for both actuation and sensing. According to some embodiments, the sensed signal is time multiplexed and charges associated with the time multiplexed signal is determined. During a forcing time period the determined charges are applied to the sense electrodes which apply the charges to the capacitive elements that force the proof mass toward its initial position.

Referring now to FIG. 1, a sense circuitry of a sensor in accordance with some embodiments is shown. The sensor 100 may include a proof mass 110, capacitive elements such as capacitors 112-114, an electrode circuitry 120 (also referred to as sensing electrode), a time multiplexing circuitry 130, a sense component 135, a processing circuitry 137, and a force feedback circuitry 140.

The sensor may be a micro-electro-mechanical systems (MEMS) sensor such as a gyroscope sensor. According to some embodiments, the proof mass 110 may move in one direction or another in response to an external actuation, e.g., rotation, movement, etc. For example, the proof mass 110 may move up/down as shown by $\Delta x$. In other words, the proof mass 110 moves from a first position to a second position in response to application of the external actuation, e.g., force, rotation, etc. The movement of the proof mass 110 causes a change in charges stored on the capacitors 112 and 114. For example, if the proof mass 110 moves up, then the charges stored on the capacitor 112 increases, e.g., $+\Delta Q$, while the charges stored on the capacitor 114 decreases, e.g., $-\Delta Q$. Similarly, if the proof mass 110 moves down, then the charges stored on the capacitor 112 decreases e.g., $-\Delta Q$, while the charges stored on the capacitor 114 increases, e.g., $+\Delta Q$. It is appreciated that the change in the charges of the capacitors 112 and 114 may be the same but in opposite polarity if the capacitors 112 and 114 have the same capacitance value. However, it is appreciated that the change in the charges of the capacitors 112 and 114 may merely be in opposite polarity of one another but the change in the charge may not be the same.

The electrode circuitry 120 outputs a signal to the time multiplexing circuitry 130. The signal is transmitted from the electrode circuitry 120 to the time multiplexing circuitry 130 that is controlled by a control signal 142. During a sensing time period, the signal, e.g., charge differential, is collected by the time multiplexing circuitry 130 and transmitted to the sense component 135 to be sensed, e.g., time multiplexed sensed signal 132. The time multiplexed sensed signal 132 is transmitted to the processing circuitry 137 to be processed, e.g., modulation, demodulation, filtering, etc. For example, appropriate charges to be applied to the electrode circuitry 120 during a forcing time period based on the processed time multiplexed sensed signal 132 may be determined and communicated to the force feedback circuitry 140.

During a forcing time period (non-sensing time period), the force feedback circuitry 140 applies the determined appropriate charges to the electrode circuitry 120, in response to the control signal 142. In some optional embodiments, the force feedback circuitry 140 may store charges associated with the processed time multiplexed sensed signal in order to conserve charges within the circuitry, thereby lowering power consumption of the circuitry.

In some embodiments, the force feedback circuitry 140 may cause determined charges to be applied to the electrode circuitry 120 (sensing electrode) during the forcing time period. In other words, during the forcing time period (period during which the proof mass 110 is forced back toward its initial state), the control signal 142 causes the force feedback circuitry 140 to transfer the determined charges to the electrode circuitry 120. The electrode circuitry 120 applies the received charges to the capacitors 112 and 114 such that the net detected changes in the capacitors 112 and 114 is reversed. In other words, the application of the received charges by the electrode circuitry 120 to the capacitors 112, 114, compensates for the differential charges detected during the sensing period of time and reverses, through application of electrostatic force in the opposite direction of the original motion, the movement of the proof mass 110. For example, the changes in charges during the sensing time period is reversed during the forcing time period, e.g., net movement on the proof mass 110 is approximately zero. According to some embodiments, the application of the charges by the electrode circuitry 120 during the forcing time period may further cause the proof mass 110 to move, e.g., move back to its original position prior to application of an external actuation. Application of the charges on the capacitors 112 and 114 eliminates the need to apply a high voltage drive to the proof mass 110, thereby reducing the power consumption of the sensor while stabilizing the operation of the sensor. Moreover, the ratio of the sense and the force pulse width is adjustable and programmable in order to optimize power versus noise in the system. It is appreciated that according to some embodiments, during the forcing time period, the time multiplexing circuitry 130 may be deactivated during the time which the force feedback circuitry 140 applies charges to the electrode circuitry 120.

It is appreciated that during sensing time period, the time multiplexing circuitry 130 time multiplexes the signal resulting from movement of the proof mass 110, in presence of an external actuation, that is to be sensed by the sense component 135. During the sensing time period, the sense component 135 outputs the sensed signal. It is appreciated that during the sensing time period, the control signal 142 deactivates or disables the force feedback circuitry 140 such that no charges are applied to the electrode circuitry 120, contrary to the non-sensing time period.

It is appreciated that while one control signal 142 is illustrated for controlling the operation of the time multiplexing circuitry 130 and the force feedback circuitry 140, any number of control signals may be used. For example, one control signal may be used to control the operation of the time multiplexing circuitry 130 while a different control signal may be used to control the operation of the force feedback circuitry 140. As such, the use of one control signal for controlling the time multiplexing circuitry 130 and the force feedback circuitry 140 is for illustrative purposes and should not be construed as limiting the scope of the embodiments.

Figure 2A:
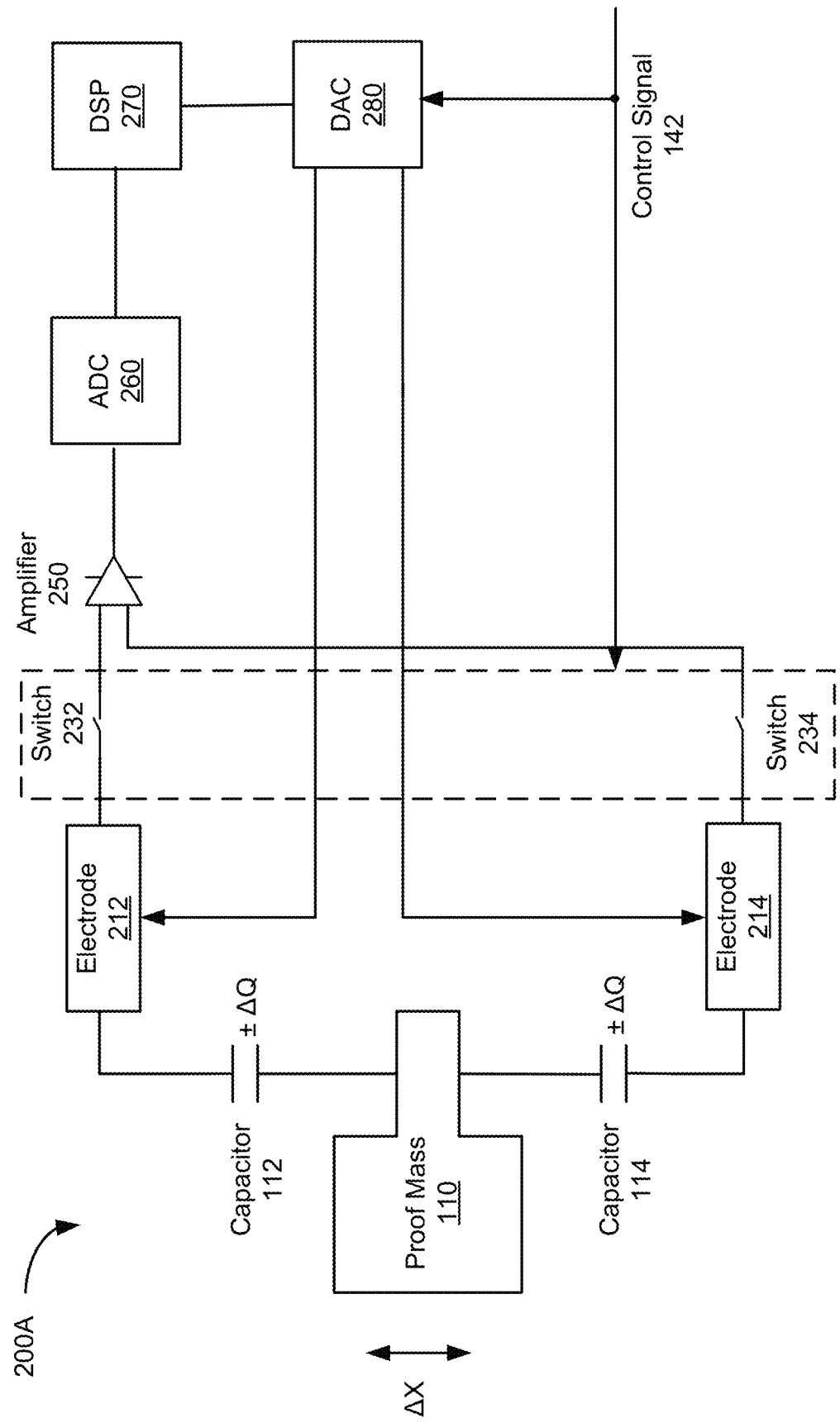
FIGS. 2A-2C show alternative sense circuitry of a sensor in accordance with some embodiments.

Referring now to FIG. 2A, a sensor with an alternative sense circuitry in accordance with some embodiments is shown. It is appreciated that elements with the same number as in FIG. 1 operate substantially similar to that of FIG. 1, as described above. The sensor 200A may include a proof mass 110, capacitive elements such as capacitors 112 and 114, electrodes 212 and 214, switches 232 and 234, an amplifier 250, an analog to digital convertor (ADC) 260, a digital signal processor (DSP) 270, and a digital to analog convertor (DAC) 280.

According to some embodiments, the proof mass 110 may move in one direction or another in response to an external actuation, e.g., rotation, force, movement, etc. For example, the proof mass 110 may move up/down as shown by $\Delta x$. In other words, the proof mass 110 moves from a first position to a second position in response to application of the external actuation. The movement by the proof mass 110 causes a change in the charges stored on the capacitors 112 and 114. For example, if the proof mass 110 moves up, then the charges stored on the capacitor 112 increases, e.g., $+\Delta Q$, while the charges stored on the capacitor 114 decreases, e.g., $-\Delta Q$. Similarly, if the proof mass 110 moves down, then the charges stored on the capacitor 112 decreases e.g., $-\Delta Q$, while the charges stored on the capacitor 114 increases, e.g., $+\Delta Q$. It is appreciated that the change in the charges of the capacitors 112 and 114 may be the same but in opposite polarity if the capacitors 112 and 114 have the same capacitance value. However, it is appreciated that the change in the charges of the capacitors 112 and 114 may merely be in opposite polarity of one another but the change in the charge may not be the same.

During the sensing time period, the switches 232 and 234 close, thereby coupling the electrodes 212 and 214 to the amplifier 250. The output of the electrodes 212 and 214 is the sensed signal. The switches 232 and 234 are controlled by a control signal 142. During the sensing time period (period during which movement is being sensed by the proof mass 110), the switches 232 and 234 close and couple the electrodes 212 and 214 to the amplifier 250. The amplifier 250 amplifies the multiplexed sensed signal and outputs the amplified signal to the ADC 260 in order to convert the signal to a digital signal. In one optional embodiment, the digital signal from the ADC 260 is input to the DSP 270 such that the signal can get processed, e.g., modulation, demodulation, filtering, etc. In some embodiments, the DSP 270 processes the digital signal to determine the appropriate amount of charges to be applied through the DAC 280 during the force period of time to the electrodes 212 and 214. The output of the DSP 270 is input to the DAC 280 to convert the processed signal to an analog signal. It is appreciated that the operation of the DAC 280 may be controlled by the control signal 142 such that during sensing time period, no charges associated with the analog signal of the DAC 280 is applied to the electrodes 212 and 214.

During the forcing time period, the switches 232 and 234 are opened, as controlled by the control signal 142, to decouple the electrodes 212 and 214 from the amplifier 250. The DAC 280 may apply charges determined by the DSP 270 during the forcing time period to the electrodes 212 and 214. It is appreciated that the DAC 280 may have switches associated therewith to couple and/or decouple the determined charges with the electrodes 212 and 214. The DAC 280 may be a voltage DAC or a current DAC in some embodiments. In other words, during the forcing time period (period during which the proof mass 110 is forced back to its initial state), the control signal 142 causes the DAC 280 to transfer the determined charges to the electrodes 212 and 214. The electrodes 212 and 214 apply the received charges to the capacitors 112 and 114 such that the net detected changes in the capacitors 112 and 114 is reversed. In other words, the application of the received charges by the electrodes 212 and 214 to the capacitors 112, 114, compensates for the differential charges detected during the sensing period of time and reverses the movement of the proof mass 110. For example, the changes in charges during the sensing time period is reversed during the forcing time period, e.g., net change charges on capacitors 112 and 114 is approximately zero. According to some embodiments, the application of the charges by the electrodes 212 and 214 during the forcing time period may further cause the proof mass 110 to move, e.g., move back to its original position prior to application of an external actuation. Application of the charges on the capacitors 112 and 114 eliminates the need to apply a high voltage drive to the proof mass 110, thereby reducing the power consumption of the sensor while stabilizing the operation of the sensor. Moreover, the ratio of the sense and the force pulse width is adjustable and programmable in order to optimize power versus noise in the system. It is appreciated that according to some embodiments, during the forcing time period, the switches 232 and 234 are opened while the DAC 280 applies charges to the electrodes 212 and 214.

It is appreciated that during sensing time period, the switches 232 and 234 time multiplex the signal resulting from movement of the proof mass 110, in presence of an external actuation. It is appreciated that during the sensing time period, the control signal 142 deactivates or disables the application of charges by the DAC 280 to the electrodes 212 and 214 such that no charges are applied to the electrodes 212 and 214, contrary to the non-sensing time period.

It is appreciated that while one control signal 142 is illustrated for controlling the operation of the switches 232 and 234 and the DAC 280, any number of control signals may be used. For example, one control signal may be used to control the operation of the switches 232 and 234 while a different control signal may be used to control the operation of the DAC 280. As such, the use of one control signal for controlling the switches 232 and 234 and the DAC 280 is for illustrative purposes and should not be construed as limiting the scope of the embodiments. It is appreciated that the sensing period of time and the forcing period of time may occur multiple times during any given cycle of the drive resonator oscillation.

Figure 2B:
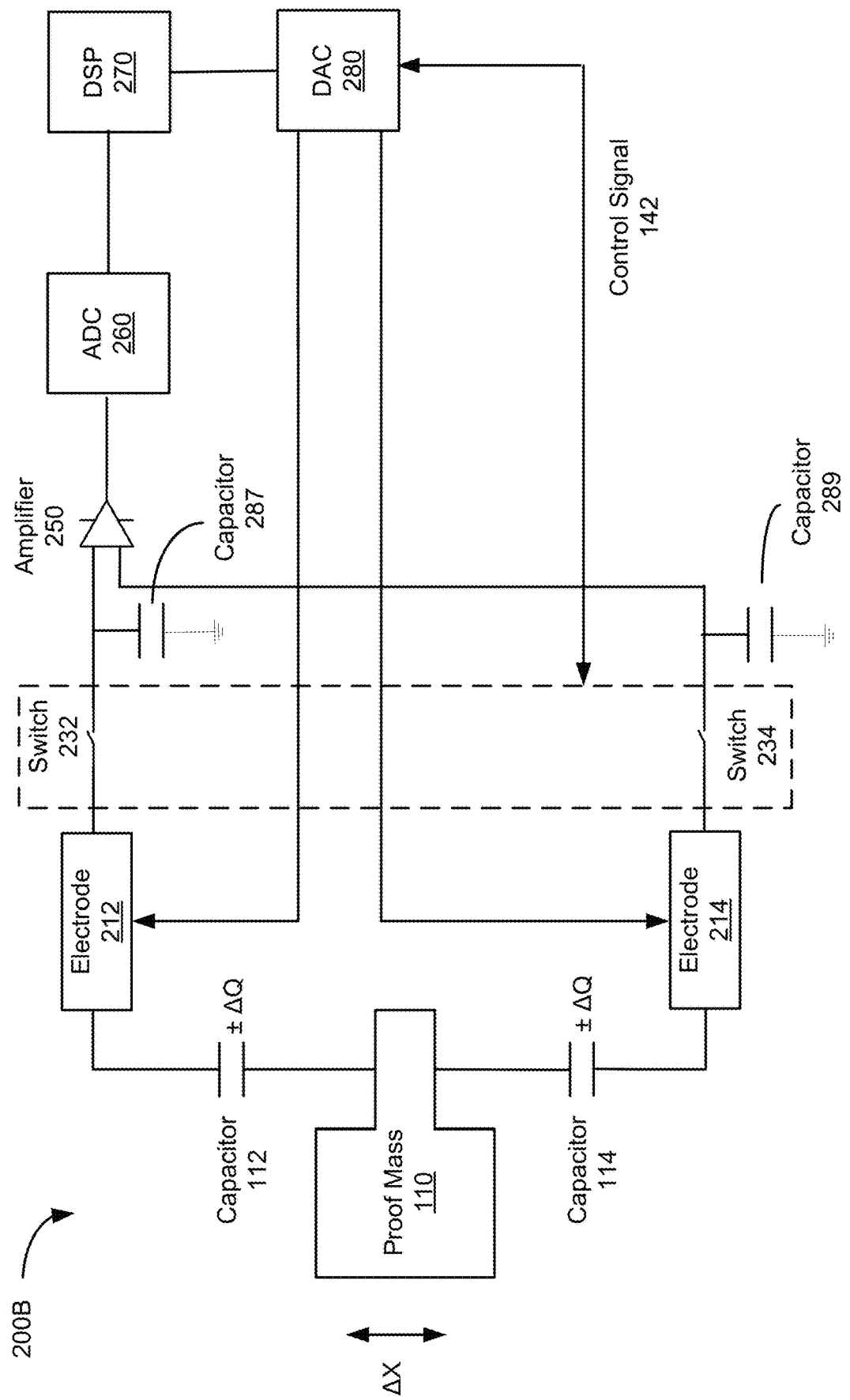

Referring now to FIG. 2B, a sensor with an alternative sense circuitry in accordance with some embodiments is shown. It is appreciated that elements with the same number as in FIGS. 1 and 2A operate substantially similar to that of FIGS. 1 and 2A, as described above. The sensor 200B includes additional capacitors 287 and 289. The capacitors 287 and 289 accumulate charges during the sensing period of time such that the net charges during any sensing period of time is transmitted to the amplifier 250.

Figure 2C:
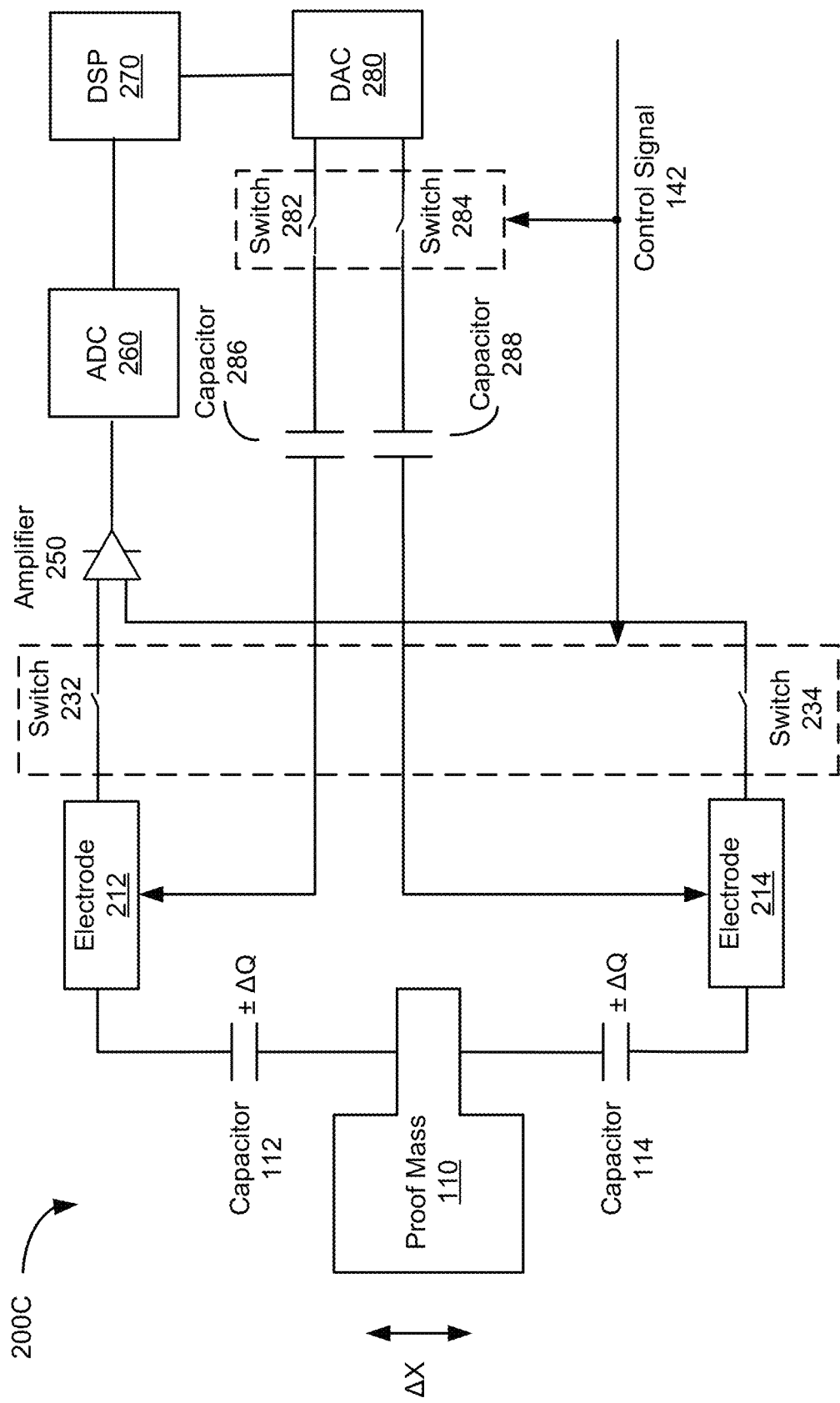

Referring now to FIG. 2C, a sensor with an alternative sense circuitry in accordance with some embodiments is shown. It is appreciated that elements with the same number as in FIGS. 1, 2A and 2B operate substantially similar to that of FIGS. 1, 2A, and 2B as described above. The sensor 200C includes switches 282 and 284 and capacitors 286 and 288. The DAC 280 is coupled to switches 282 and 284 that are controlled by the controlled signal 142. During the forcing period of time, the switches 282 and 284 close to couple the DAC 280 to the capacitors 286 and 288. As such, the determined charges are applied to the electrodes 212 and 214 through capacitors 286 and 288 respectively. It is appreciated that during the forcing period of time, the control signal 142 causes the switches 232 and 234 to open.

Figure 3:
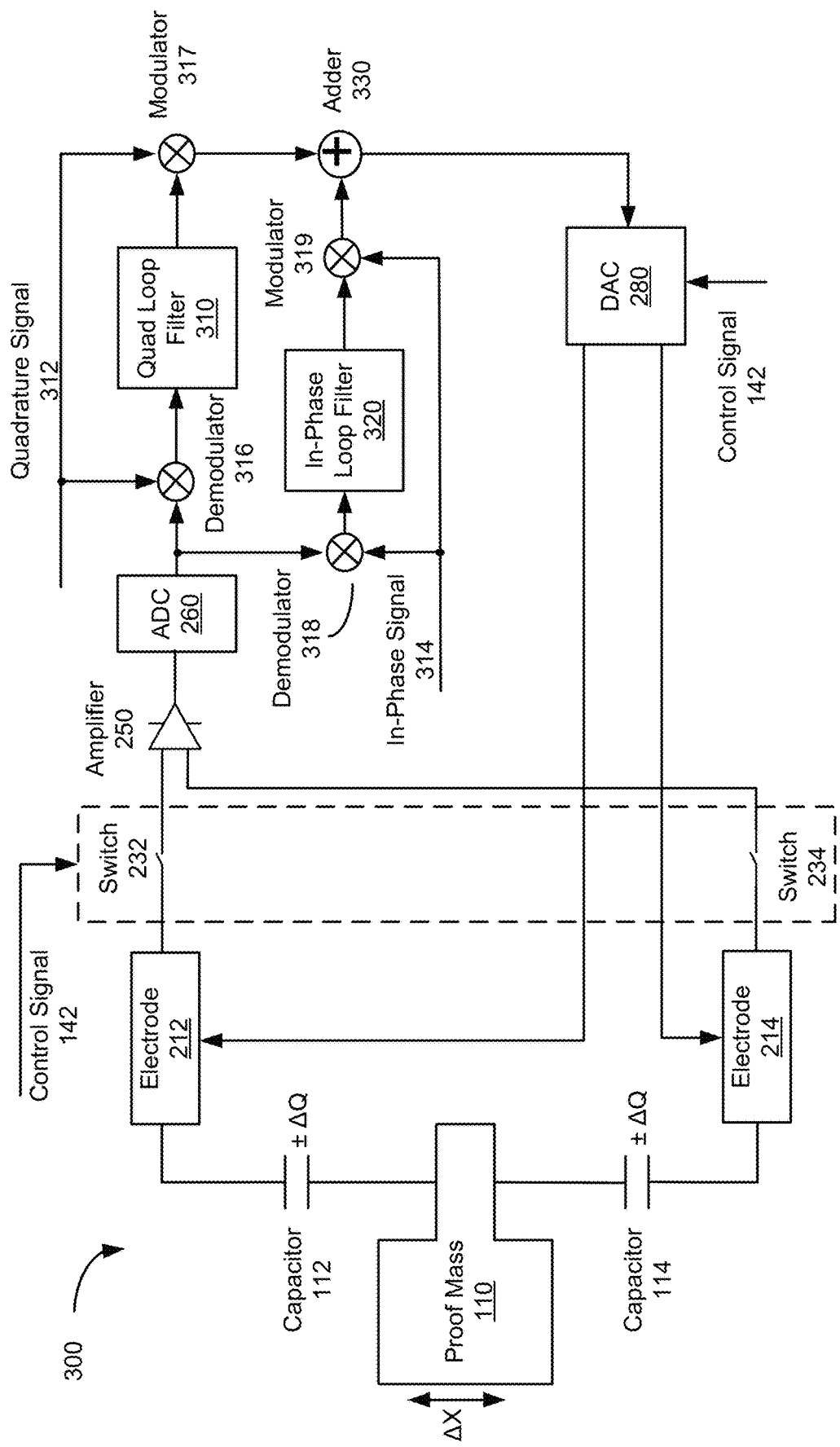
FIG. 3 shows yet another alternative sense circuitry of a sensor in accordance with some embodiments.

Referring now to FIG. 3, a sensor 300 with yet another alternative sense circuitry in accordance with some embodiments is shown. FIG. 3 is substantially similar to that of FIG. 2A. In this embodiment, however, the DSP 270 is replaced with demodulators 316, 318 and modulators 317,319, an adder 330, quadrature loop filter 310 and an in-phase loop filter 320, in order to track the in-phase and quadrature mechanical inputs to the proof mass 110. The digital signal from ADC 260 is demodulated by demodulators 316 and 318 with quadrature signal 312 and in-phase signal 314 respectively in order to correlate the time multiplexed signal with its quadrature and in-phase components, in order to track the quadrature and the in-phase components. The output of the demodulator 316 is input to the quadrature loop filter 310 in order to remove the in-phase component and the output of the modulator 317 is input to the in-phase loop filter 320. The output of the quadrature loop filter 310 is modulated with the quadrature signal 312 using modulator 317 while the output of the in-phase loop filter 320 is modulated with the in-phase signal 314 using modulator 319. The output of the modulators 317 and 319 are summed up using the adder 330 and output to the DAC 280. It is appreciated that the embodiments described herein reduces sensitivity to clock jitter by utilizing a directly digitized carrier signal, rather than the traditional signals generated by a PLL.

Figure 4:
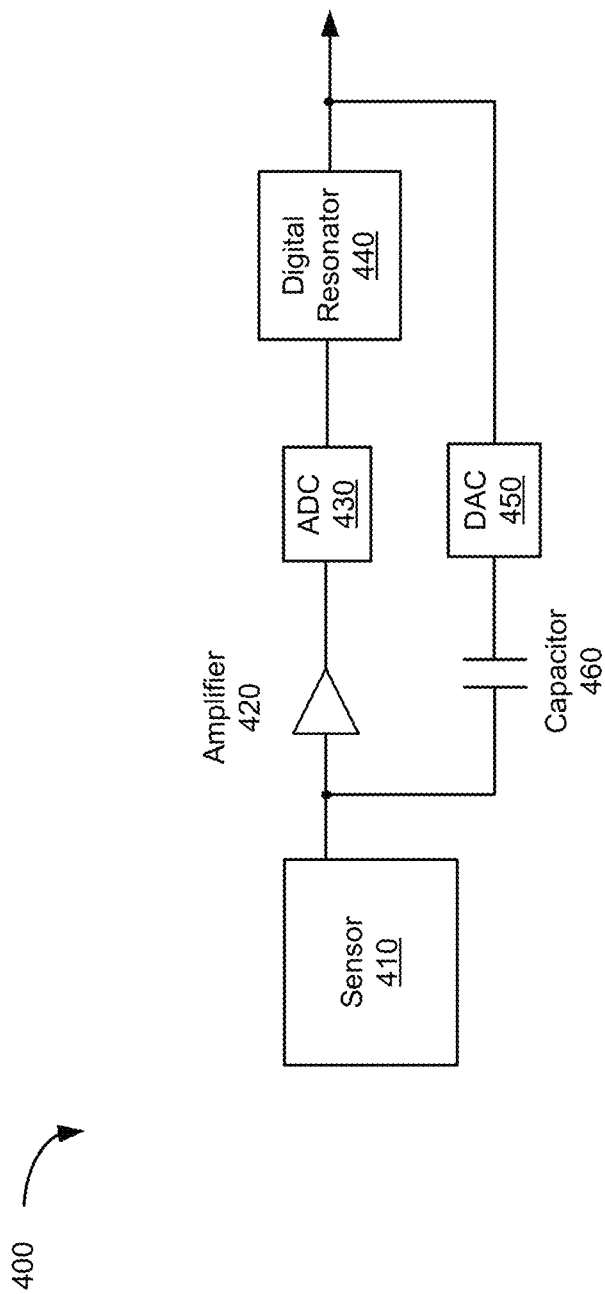
FIG. 4 shows a drive circuitry of a sensor in accordance with some embodiments.

Referring now to FIG. 4, a drive circuitry of a sensor in accordance with some embodiments is shown. The sensor 410 is coupled to an amplifier 420. The amplifier 420 is coupled to ADC 430 which is coupled to a digital resonator 440. The digital resonator 440 is coupled to the input of the amplifier 420 through a feedback loop and it may null out error associated with the carrier frequency. The feedback loop includes a DAC 450 in series with an optional capacitor 460. The amplifier 420 amplifies the drive signal and couples it to the ADC 430 that converts the amplified signal to a digital signal. The amplifier 420 and the ADC 430 operate on residual error of the drive signal rather than the full signal. As such, the impact of the gain and sensitivity of the amplifier 420 and the ADC 430 is reduced.

The digital resonator 440 senses digitizer loop that uses the DAC 450 and a partially digital loop to digitize the drive signal, thereby relaxing drive capacitor to voltage block's phase requirement which reduces the impact of phase delay of the amplifier 420. The feedback loop including the DAC 450 and the capacitor 460 cancel the incoming drive signal, leaving an error signal to be processed by the amplifier 420. It is appreciated that the feedback loop may also include a bandpass digital filter to suppress the error further and to provide a digitized drive signal at the DAC 450 input.

Figure 5:
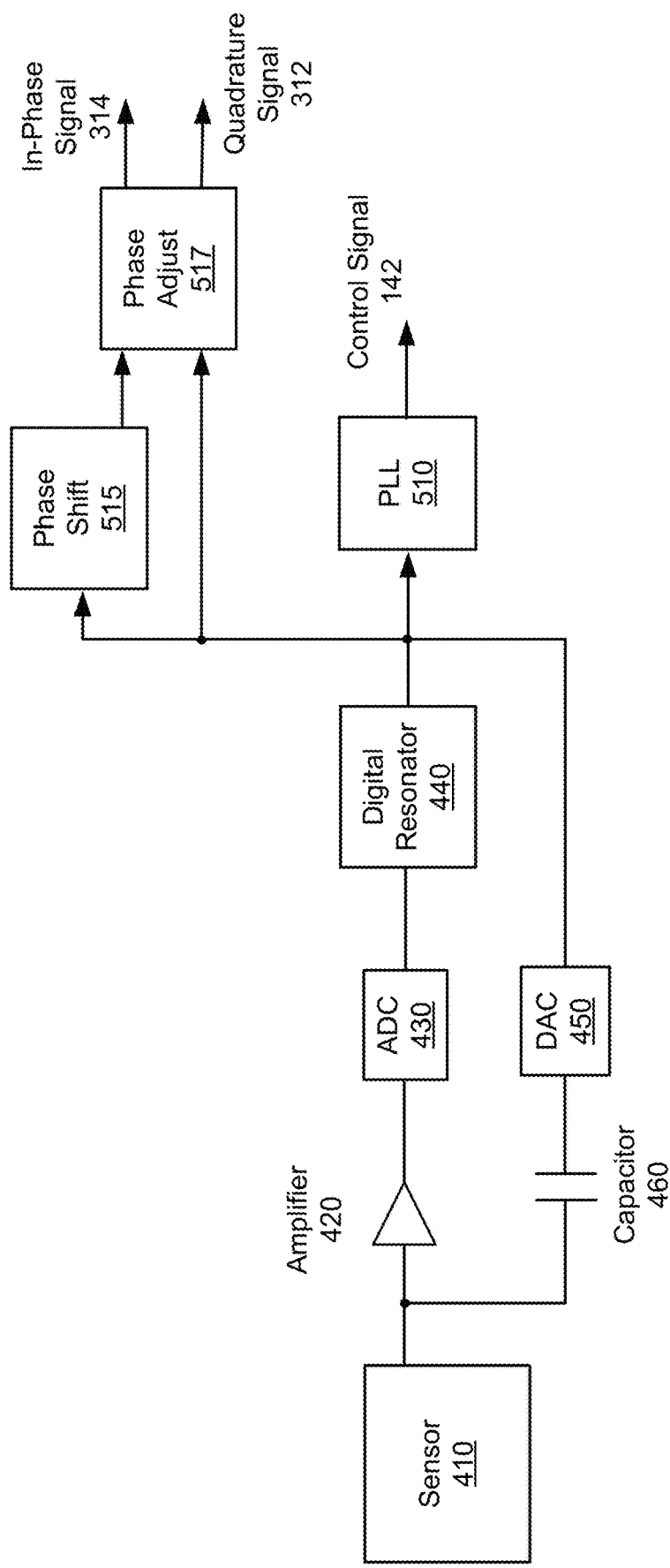
FIG. 5 shows an alternative drive circuitry of a sensor in accordance with some embodiments.

Referring now to FIG. 5, an alternative drive circuitry of a sensor in accordance with some embodiments is shown. FIG. 5 is substantially similar to FIG. 4 except that the output of the digital resonator 440 is input to the PLL 510 that may generates the control signal 142, as discussed above. It is appreciated that the digital resonator 440 may also be coupled to a phase shift 515 component that shifts the phase of the signal by 90°. The output of the resonator 440 and the phase shift 515 are input to the phase adjust 517 component to adjust the phase of the signal and to generate the in-phase signal 314 and the quadrature signal 312 that are used as input signals to the modulators/demodulators 316-319 of FIG. 3.

It is appreciated that the resonance frequency of the resonator may be matched to the incoming drive frequency by deriving the digital resonator parameters from the PLL frequency, locked to the drive frequency.

Figure 6A:
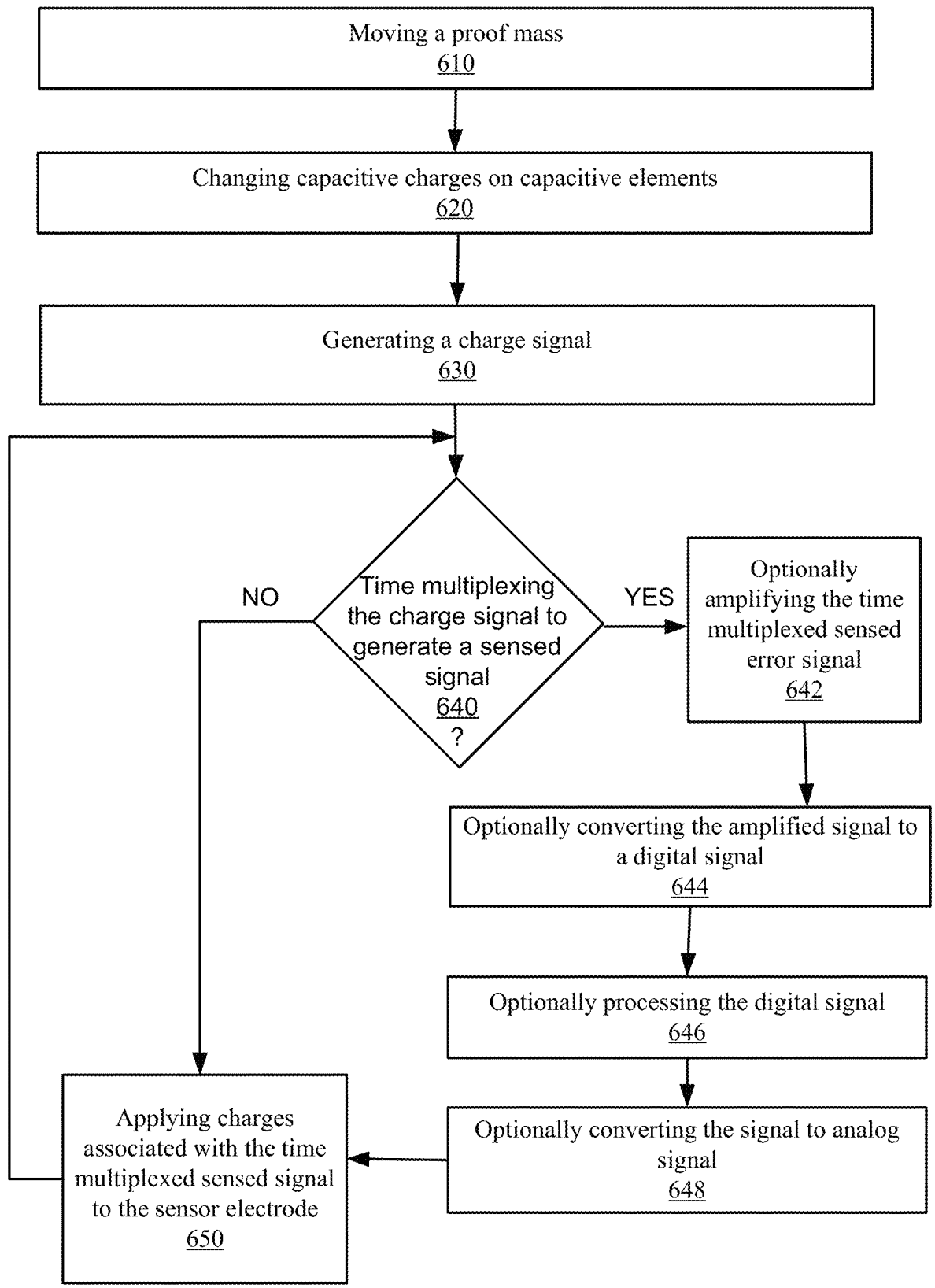
FIGS. 6A-6B show a flow diagram for low power consumption force feedback on the sense circuitry and drive circuitry respectively in accordance with some embodiments.
Figure 6B:
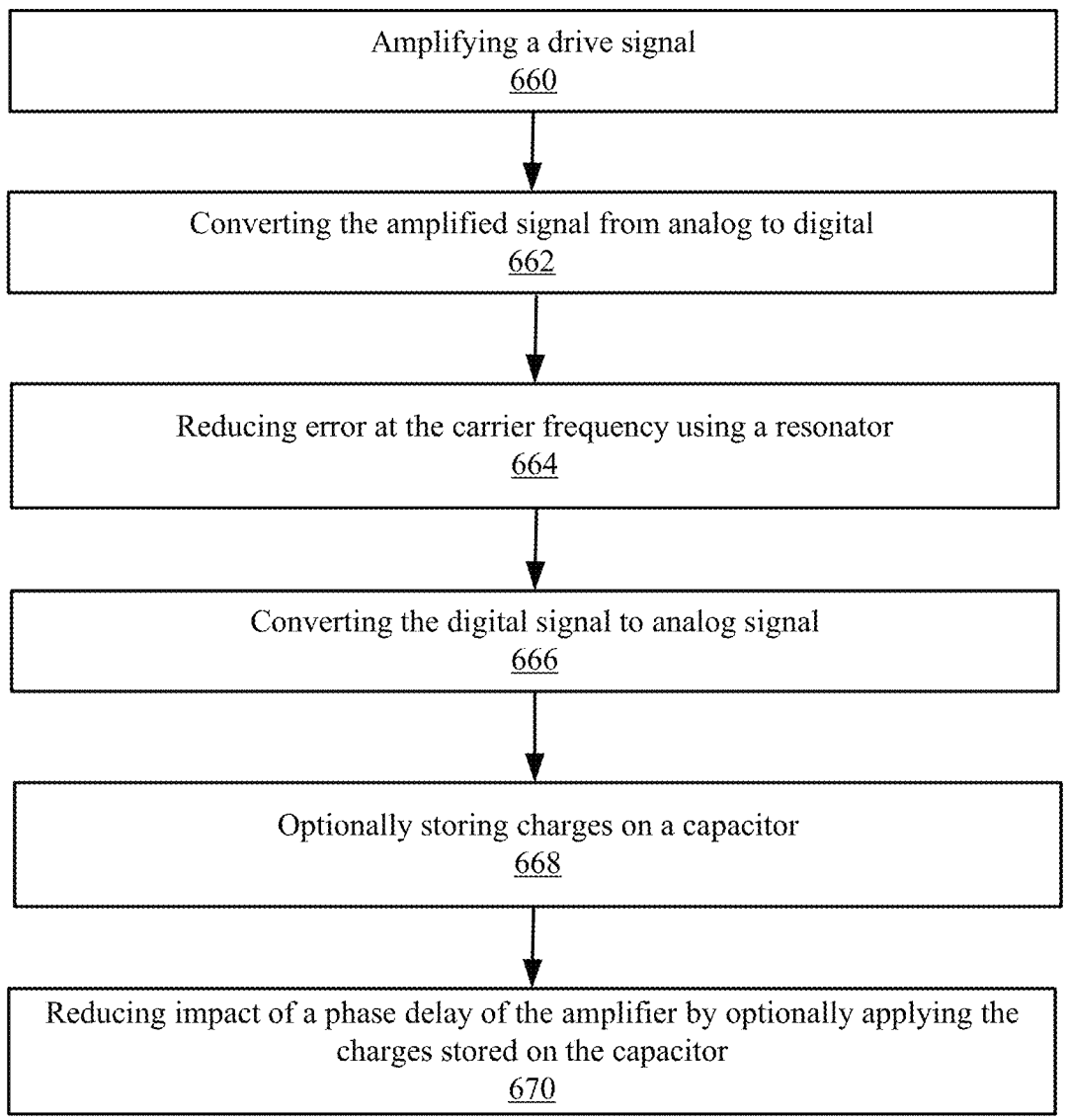

Referring now to FIGS. 6A-6B, a flow diagram for low power consumption force feedback on the sense circuitry and drive circuitry respectively in accordance with some embodiments is shown. Referring specifically to FIG. 6A, a flow diagram associated with the sense circuitry of the sensor in accordance with some embodiments is shown.

Steps 610-648 occur during a sensing time period. At step 610, the proof mass is moved from a first position to a second position in response to an external actuation (as discussed in FIGS. 1-3). At step 620, capacitive charges on capacitive elements is changed in response to the movement of the proof mass (see FIGS. 1-3). At step 630, a sensed signal is generated based on the change in charges stored on the capacitive elements, e.g., using electrode(s) of FIGS. 1-3. At step 640, it is determined whether the sensed signal is to be time multiplexed based on receiving a control signal. For example, the switches and/or the time multiplexing circuitry of FIGS. 1-3 may be used. If it is determined that no time multiplexing is to be performed, then charges associated with the time previously time multiplexed sensed signal is applied to the sensor electrode(s), at step 650.

On the other hand if it is determined that the sensed signal is to be time multiplexed, the process may optionally go to step 642. At step 642, the time multiplexed sensed signal may be amplified and converted to a digital signal at step 644. At step 646, the sensed signal may be processed, e.g., modulated, demodulated, filtered, appropriate charges based on the sensed signal may be determined, etc. At optional step 648, the processed signal is converted to an analog signal, as described by FIGS. 1-3.

During forcing time period, at step 650, charges determined by the processing at step 648 is applied to the capacitive elements through the sensing electrode(s). It is appreciated that during the forcing time period, the time multiplexing of the sensed signal is terminated. In other words, the sensing by the circuitry is deactivated, e.g., by opening the switches 232-234, such that the appropriate charges can be applied to the capacitive elements, as described in FIGS. 1-3. It is appreciated that after application of the charges, the process may be reversed such that the sensing by the sensor is once again activated and the application of the charges to the capacitive elements is deactivated.

Referring now to FIG. 6B, a flow diagram associated with the drive circuitry of the sensor in accordance with some embodiments is shown. At step 660, the drive signal is amplified and converted to a digital signal at step 662, as described in FIGS. 4-5. At step 664, a resonance signal is generated by resonating at a digital resonance frequency to reduce error. At step 666, the resonance frequency is converted to analog signal at step 666. At step 668, charges associated with the analog signal is stored on a capacitor, as described in FIGS. 4-5. Thus, at step 670, charges stored on the capacitor is applied to the amplifier, thereby closing a feedback loop around the amplifier and the ADC, thereby reducing impact of a phase delay associated with the amplifier and the ADC, as described in FIGS. 4-5. It is appreciated that storing charges on the capacitor at step 668 and application of those charges to the amplifier at step 670 may be through components other than the capacitor.

Figure 7:
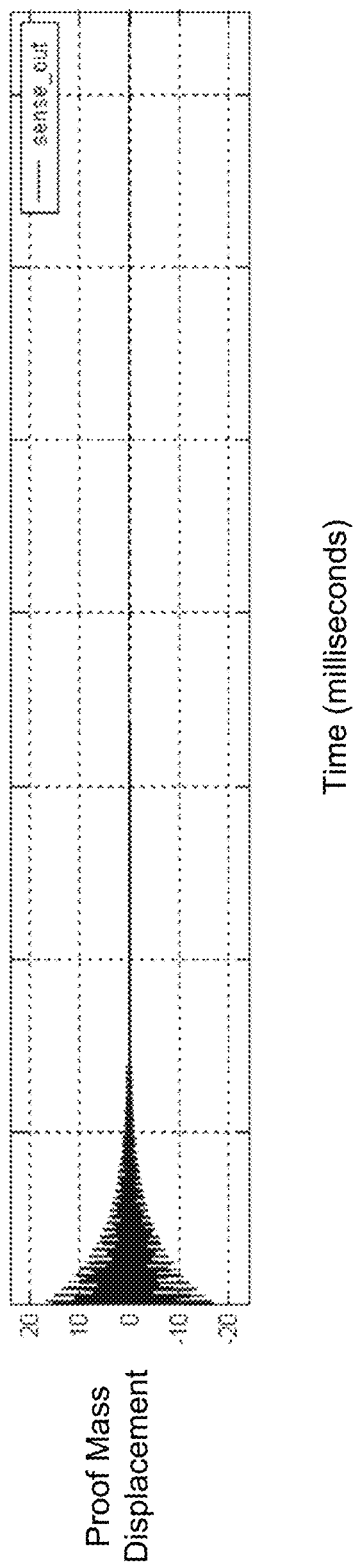
FIG. 7 shows an exemplary simulation of a proof mass in accordance with some embodiments.

Referring now to FIG. 7, an exemplary simulation of a proof mass in accordance with some embodiments is shown. The simulation illustrates the proof mass movement back and forth and oscillation over time until it is brought to its initial state. For example, the proof mass may move from a first position to a second position when an external actuation is applied. The circuitries, as described above with reference to FIGS. 1-6B, sense the signal and close the force feedback circuitry in order to apply appropriate charges multiple times. It is appreciated that proof mass may be brought to a third position between the first and the second positions. It is further appreciated that the process may be repeated for the first position and the third position and application of charges during the forcing time period may bring the proof mass to a fourth position that is between the first position and the third position. Accordingly, the proof mass position is converged to a steady state over time, e.g., steady state may be the first position before application of external actuation.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A sensor comprising:
   a proof mass configured to move from a first position to a second position in response to application of an external actuation;
   a drive circuitry configured to drive the proof mass into oscillation, and wherein a sense circuitry of the sensor to detect movement of the proof mass, wherein the drive circuitry includes:
   an amplifier configured to amplify a drive signal;
   an analog to digital convertor configured to convert the amplified drive signal from analog signal to digital signal;
   a digital resonator configured to resonate at a resonance frequency to reduce error; and
   a feedback loop receiving signal from the digital resonator and further configured to apply a feedback signal to an input of the amplifier, wherein the feedback loop comprises a digital to analog convertor coupled in series with a capacitor; and
   the sense circuitry comprising:
   capacitive elements configured to change capacitive charge stored thereon in response to the proof mass moving from the first position to the second position;
   an electrode circuitry coupled to the capacitive elements configured to generate a charge signal thereof;
   a sense component coupled to the electrode circuitry configured to generate a sensed signal based on the charge signal during a sensing time period; and
   a force feedback loop circuitry configured to apply a charge associated with the sensed signal to the electrode circuitry, responsive to the control signal, during a forcing time period to change capacitive charge of the capacitive elements to move the proof mass from the second position to another position, and wherein the sense component is inactive during the forcing time period.

2. The sensor as described by claim 1, wherein the electrode circuitry applies the charge associated with the sensed signal to the capacitive elements, wherein the another position is a position between the first position and the second position, and wherein application of the charge received from the force feedback circuitry to the capacitive elements move the proof mass to the another position and reduce movement of the proof mass.

3. The sensor as described by claim 1, wherein the force feedback loop circuitry comprises a plurality of switches that open and close in response to the control signal, wherein the plurality of switches closes during the forcing time period and opens during the sensing time period.

4. The sensor as described by claim 1 further comprising:
an analog to digital convertor configured to convert the sensed signal to a digital signal.

5. The sensor as described by claim 4 further comprising:
a digital signal processor (DSP) coupled to the analog to digital convertor configured to process the sensed signal and to determine the charge associated with the sensed signal to be applied to the electrode circuitry during the forcing time period.

6. The sensor as described by claim 5 further comprising:
a digital to analog convertor (DAC) coupled to the DSP, wherein the DAC is configured to convert digital signal to analog signal and to generate a force signal based on the determined charge associated with the sensed signal.

7. A method comprising:
amplifying a drive signal of a sensor using an amplifier;
converting the amplified drive signal from analog signal to digital signal;
resonating at a digital resonance frequency to generate a digital drive signal;
converting the digital drive signal from digital to analog signal;
storing charges associated with the analog resonance signal on a capacitor;
in response to an external actuation moving a proof mass of a sensor from a first position to a second position, changing capacitive charges on a plurality of capacitive elements;
generating a charge signal in response to the changing of the capacitive charges, wherein the generating utilizes sense electrodes;
responsive to a control signal, time multiplexing the charge signal to generate a sensed signal during a sensing time period;
determining a charge associated with the sensed signal to be applied during a forcing time period;
responsive to the control signal, applying the determined charges to the sense electrodes during the forcing time period, wherein the sense electrodes apply the determined charges to the plurality of capacitive elements to force the proof mass to return to its initial state; and
reducing impact of a phase delay associated with the amplifier by applying the charges stored on the capacitor to the amplifier.

8. The method as described in claim 7, wherein the time multiplexing is through a plurality of switches that close during the sensing time period and open during the forcing time period.

9. The method as described in claim 7 further comprising:
amplifying the sensed signal after the time multiplexing.

10. The method as described by claim 9 further comprising:
converting the amplified sensed signal to a digital signal.

11. The method as described by claim 10 further comprising:
processing the digital signal to determine the charge associated with the sensed signal, wherein the determined charge once applied through the sense electrodes forces the proof mass to return to the first position.

12. The method as described by claim 7 further comprising:
responsive to the control signal, opening a plurality of switches coupled to the sense electrodes during the sensing time period to decouple application of the charges to the sense electrodes and the plurality of capacitive elements; and
responsive to the control signal, closing the plurality of switches coupled to the sense electrodes during the forcing time period to apply the determined charges to the sense electrodes and the plurality of capacitive elements.

13. A sensor comprising:
a proof mass configured to move from a first position to a second position in response to application of an external actuation;
a drive circuitry configured to drive the proof mass into oscillation, and wherein a sense circuitry of the sensor to detect movement of the proof mass, wherein the drive circuitry includes:
an amplifier configured to amplify a drive signal;
an analog to digital convertor configured to convert the amplified drive signal from analog signal to digital signal;
a digital resonator configured to resonate at a resonance frequency to reduce error; and
a feedback loop receiving signal from the digital resonator and further configured to apply a feedback signal to an input of the amplifier, wherein the feedback loop comprises a digital to analog convertor coupled in series with a capacitor; and
the sense circuitry comprising:
capacitive elements configured to change capacitive charge stored thereon in response to the proof mass moving from the first position to the second position, wherein the capacitive elements include a first capacitive element and a second capacitive element wherein the change in capacitive charge of the first and the second capacitive elements is in opposite polarities;
sense electrodes coupled to the capacitive elements configured to generate a charge signal thereof;
a sense component coupled to the sense electrodes configured to generate a sensed signal based on the charge signal during a sensing time period; and
a force feedback loop circuitry configured to apply a charge associated with the sensed signal to the sense electrodes, during a forcing time period and responsive to a control signal, wherein the sense electrodes are configured to apply the charge associated with the sensed signal to the capacitive elements and reverse the change in capacitive charge on the first and the second capacitive elements to move the proof mass from the second position back toward the first position, and wherein the sense component is inactive during the forcing time period.

14. The sensor as described by claim 13, wherein application of the charge received from the force feedback circuitry to the capacitive elements reduce movement of the proof mass.

15. The sensor as described by claim 13, wherein the force feedback loop circuitry comprises a plurality of switches that open and close in response to the control signal, wherein the plurality of switches closes during the forcing time period and opens during the sensing time period.

16. The sensor as described by claim 13 further comprising:
an analog to digital convertor configured to convert the sensed signal to a digital signal; and
a digital signal processor (DSP) coupled to the analog to digital convertor configured to process the sensed signal and to determine the charge associated with the sensed signal to be applied to the electrode circuitry during the forcing time period.

17. The sensor as described by claim 16 further comprising:
- a digital to analog convertor (DAC) coupled to the DSP, wherein the DAC is configured to convert digital signal to analog signal and to generate a force signal based on the determined charge associated with the sensed signal.

* * * * *